(12) United States Patent
Bech et al.

(10) Patent No.: US 7,899,564 B2
(45) Date of Patent: Mar. 1, 2011

(54) PROCEDURE AND APPARATUS FOR GENERATING AUTOMATIC REPLAY OF RECORDINGS

(75) Inventors: Søren Bech, Holstebro (DK); John Madsen, Holstebro (DK)

(73) Assignee: Bang & Olufsen, Struer (DK)

( * ) Notice: Subject to any disclaimer, the term of this patent is extended or adjusted under 35 U.S.C. 154(b) by 808 days.

(21) Appl. No.: 11/667,268

(22) PCT Filed: Nov. 9, 2005

(86) PCT No.: PCT/DK2005/000718

§ 371 (c)(1),
(2), (4) Date: Oct. 1, 2007

(87) PCT Pub. No.: WO2006/050731

PCT Pub. Date: May 18, 2006

(65) Prior Publication Data

US 2008/0188964 A1    Aug. 7, 2008

(30) Foreign Application Priority Data

Nov. 9, 2004   (DK) ............................... 2004 01727
Oct. 11, 2005  (DK) ............................... 2005 01421

(51) Int. Cl.
*G06F 17/00* (2006.01)
(52) U.S. Cl. ....................................................... 700/94
(58) Field of Classification Search ................... 700/94
See application file for complete search history.

(56) References Cited

U.S. PATENT DOCUMENTS

| 5,918,223 | A | 6/1999 | Blum et al. |
| 7,313,571 | B1 * | 12/2007 | Platt et al. ............................ 1/1 |
| 7,500,007 | B2 | 3/2009 | Ikezoye et al. |
| 2002/0037083 | A1 * | 3/2002 | Weare et al. ................... 381/58 |
| 2004/0143349 | A1 | 7/2004 | Roberts et al. |
| 2006/0106867 | A1 | 5/2006 | Burges et al. |
| 2006/0169126 | A1 | 8/2006 | Ishiwata et al. |
| 2008/0256115 | A1 | 10/2008 | Beletski et al. |
| 2009/0063627 | A1 | 3/2009 | Nowacek |

FOREIGN PATENT DOCUMENTS

| WO | WO 2002/029610 | 4/2002 |
| WO | WO 2004/027646 | 4/2004 |
| WO | WO 2004/095315 | 11/2004 |
| WO | WO 2006/025797 | 3/2006 |
| WO | WO 2006/050731 | 5/2006 |
| WO | WO 2007/053770 | 5/2007 |

OTHER PUBLICATIONS

Simon Dixon. "Automatic Extraction of Tempo and Beat From Expressive Performances". Journal of New Music Research, vol. 30, No. 1, 2001, pp. 39-58.
Gracenot_Mobile MusicID (http://www.gracenote.com/business_solutions/mobileMusic/). Retrieved May 18, 2009.

* cited by examiner

*Primary Examiner*—Andrew C Flanders
(74) *Attorney, Agent, or Firm*—Harness, Dickey & Pierce, P.L.C.

(57) ABSTRACT

A procedure and apparatus for generating automatic replay of recordings.

4 Claims, 11 Drawing Sheets

| # | Vector | | Genre |
|---|---|---|---|
| 1 | MFCC+GMM | Rhythm | e.g. Jazz |
| 2 | | | |
| | | | |
| x | | | |

Fig. 4

| Track | Vector | | Genre | File reference |
|---|---|---|---|---|
| 1 | MFCC+GMM | Rhythm | e.g. Jazz | e.g. xx.yy.zzz |
| 2 | | | | |
| | | | | |
| n | | | | |

Fig. 5

| # | Vector | |
|---|---|---|
| 1 | MFCC+GMM | Rhythm |

PROCEDURE AND APPARATUS FOR GENERATING AUTOMATIC REPLAY OF RECORDINGS

A procedure and apparatus for generating automatic replay of recordings.

The invention relates to a procedure for controlling the playback of digital recordings from a collection of digital recordings.

Traditionally, playing of a recording in a private environment occurs by selection of a record, placing it on a turntable, selecting a track and switching the reproducer on. More recently, a Compact Disc is inserted into the player, a track is selected and played. In a broadcast environment, the selection of a recording would be aided by technology in the form of an index to a "record library", and planning of a programme would generate a playlist. As technology advanced, the playlist would be created interactively with computer support, and those institutions that stored their sound recordings on Compact Disc would in consequence provide playlist-controlled access to a juke-box type storage. The latest developments have transferred the storage to hard disk drives, and the sound files may be compressed and data-reduced, such as MP3 (MPEG II layer 3). As the cost of computer equipment has fallen, this technology has also become accessible to private individuals. Today private individuals on average have access to 50 times as many selections (recordings) of music as the average record buyer in the 1960s. For this reason it is unlikely that each and every recording available has actually been heard, and access via registers is impractical, because the selection criteria "genre", "composer", "band", "instrument", "performer" may actually be meaningless in the context of the desire to hear music.

Various schemes have been devised to generate playlists from an input in the form of a whistled or hummed tune, or based on an automated analysis of the content of "typical" recordings. However, they all require the user to perform a value judgment and to initiate playing according to an expressed playlist.

Simultaneously, there is a need to accommodate modern living's desire for "individualized conformity" and to obtain as much entertainment for as little effort as possible in the hedonistic spirit.

According to one aspect of the present invention, the generation of a playlist with many or few members, for starting a reproduction of a recording, is based on certain parameters, the values of which are evaluated automatically based on previous choices by the listener. The involvement of the listener in the selection of members for the playlist will be limited to consciously having played certain recordings in the past. Ideally this playing will have occurred via the system, but this is not an absolute requirement.

A user may desire to issue a command of the following types (list not exhaustive):
play all tracks from the user database
play tracks pre-categorized in selected genres from the user database
play tracks of selected artists from the user database
play a defined mix of the above mentioned options
play tracks that are "similar" to a given track in the database
integrate another database into the accessible database
play a defined mix of the above options
"provide a theme of mood, predominantly Jazz, alternatively Rock, and a little bit of Blues".

According to an aspect of the invention, the listener is able to input a response to the playing of any particular recording by means of an interface. Such a response may be as primitive as switching-off after just 10 seconds or classifying the recording on a scale of preference.

A multitude of methods are available for automatic music classification, but they are not inherently compatible. One instance is U.S. Pat. No. 5,918,223, but it may be regarded as being unnecessarily complex for the present purpose.

The advantages of the invention are obtained in a procedure for controlling the playback of recordings from a collection of recordings, by inputting a playback order structured as a more or less fuzzy expression of general characteristics, said collection of recordings being stored in digital form in one location or in a distributed storage system, each recording being classified in a multidimensional parameter space common to all recordings stored, preferably without conscious intervention from the user, according to pre-defined or self-organizing parameters, when the fuzzy expression is input in the form of one or several seed recordings, said seed recordings being classified in the same multidimensional parameter space used for the collection, said multidimensional classification being compared to combinations of classifications identifying each recording in said collection, the output for playback being a list of access codes for those recordings having parameters fulfilling a multidimensional distance criterion with respect to the seed recordings, the list being used to access sequentially the recordings concerned from the storage system.

Certain of the above terms need to be defined. A playback order is an input to the procedure that may be precise, such as identifying title and performer or in very vague terms, such as referring to a recording or selection that has been played previously, but about which nothing specific is known. A fuzzy expression of general characteristics defines an imprecise input that has more intention than specific information. The expression is not intended to indicate the concept of fuzzy sets originally described by L. Zadeh. The context and possible clustering of the information makes the interpretation of such an input largely self-organizing. A multidimensional parameter space is the totality of information that may be assigned to the collection of recordings, and in which each recording has a specific combination that is extracted by means of signal extraction performed on each recording according to pre-defined criteria. A seed recording is a recording that is known or discovered (during replay) by the user to be desirable, and in relation to which a desire for similar recordings occurs. A multidimensional distance criterion is a calculation of vector distance in the multidimensional parameter space, in which simple multidimensional geometric rules may be used as well as weighting of distances, or using clusters as attractors, in which case the distance criterion evolves into a more general similarity criterion. A genre in the traditional sense is a category that is used to distinguish between recordings according to recognized criteria. A meta-genre is an internal category contributing to the structuring of a collection of recordings that appears from the analyses performed according to the present invention, but it is non-verbalised and is not influenced consciously by any user. By a running spectral analysis is intended an analysis of spectral content, with or without weighting of spectral components, performed in consecutive time slices.

It should be noted that as the collection of recordings are stored in digital form, the actual analysis consisting of the calculation of vectorial distances and grouping can be performed at much higher speeds than real time reproduction of a recording. Furthermore, while it is recognized that the ideal representation of music occurs with a high sample rate and a large bit depth linear representation, some types of classification may equally be performed on data reduced representations, such as those making use of psychoacoustic masking.

Known formats comprise MPEG II Layer 3 (MP3), Atrac (™, Sony Corp.), or Vorbis (™, Xiph. Org).

An embodiment of the invention is particular in that the pre-defined parameters are based on running spectral analyses for each recording combined with rhythm analyses. Experience has shown that such analyses, performed with suitable time and frequency windows are able to distinguish between performances and types of music, essentially without manual interference.

A further embodiment of the invention is particular in that the classification of each recording consists in defining the multidimensional vectorial distances between self-organizing clusters obtained by applying running spectral analyses and rhythm analyses for the collection of recordings. It has turned out that the various types of music and the particular performances that make up the collection organize themselves into clusters when subjected to the above mentioned running spectral analyses, and that the vectorial distances are a good way to distinguish each recording in a way that permits it to be compared as to apparent similarity to other recordings.

A further embodiment relates to a procedure for adding a recording to the collection, which is particular in that the recording is subjected to running spectral analyses and rhythm analyses of the type that was applied to the prior members of the collection, and associating the classification with the access code for the added recording. In this way it is ensured that the same, essentially self-organizing classification of the collection is applied to each addition to the collection, in order that its usefulness grows with each addition.

The invention also relates to apparatus for performing the procedures described above.

One particular embodiment is particular in that it comprises means for inputting digital representations of at least one track of music, means for performing a running spectrum analysis on said representation, means for performing a rhythm analysis on said representation, means for entering the results of said analyses in a storage matrix, means for clustering the information in order to obtain a vector representation in a further storage matrix, means for associating said vector representation with meta-data representing discographical information relating to the track of music (artist, composer, title, duration), means for storing and organizing this information in database form. This is a general input apparatus that is able to take any number of music tracks and process them in order to structure the result in a database with minimum one member.

A further embodiment relates to an input apparatus as described above dedicated to a collection of tracks of music. It is particular in that it comprises means for inputting digital representations of a large number of tracks of music, means for performing a running spectrum analysis on said representation, means for performing a rhythm analysis on said representation, means for entering the results of said analyses in a storage matrix, means for clustering the information in order to obtain a vector representation in a further storage matrix, means for associating said vector representation with meta-data representing discographical information relating to the tracks of music (artists, composers, titles, durations), means for presenting this information in database form.

A further embodiment of the invention as relates to an apparatus is particular in that it is able to handle input of fresh tracks of music. It is particular in that it comprises the apparatus defined in claim 1 for inputting further tracks of music into a database obtained by the apparatus defined in claim 2.

A further embodiment relates to an output apparatus, such as a media player, for accessing the database. It is particular in that it further comprises means for entering a query to said database, means for extracting response information relative to said query, means for structuring the response information in the form of a playlist of tracks of music, and means for using said playlist information as an order for consecutive replay of said tracks of music via a replay system.

A further embodiment relates to an output apparatus, such as a media player, in which the accessing of the database is non-verbal, because it consists of presenting a track of music, to which similar tracks are desired. An apparatus of this type is particular in that the query is input as a complete track of music constituting an exemplary recording by means of a query order linked to the input apparatus defined in claim 1 and working on one individual track of music only.

A further embodiment relates to the interaction with an output apparatus for causing a change in the automatic generation of a revised playlist based on a track that is presented on an existing playlist, while said playlist is executed. This embodiment is particular in that the identification is in the form of the execution of a pre-arranged simple input, such as clicking on a dedicated spot on a display screen on a media player. The further advantage derived from this embodiment is that the track as such does not need to be analyzed, because it has been analyzed before, and the information required to establish the multidimensional distances with respect to this new seed recording is already available in the system.

A close approximation to ideal analysis, vector representation and playlist generation is commonly obtained when the digital representation is a linear PCM representation. However, it has been determined that useful results may also be obtained in a further embodiment of the invention as applied to an apparatus, such as a media player, when the digital representation is a data reduced representation based on psychoacoustic masking.

The invention will be described in further detail in the following with reference to an embodiment, which is shown in the following drawings, in which.

Figure 1:
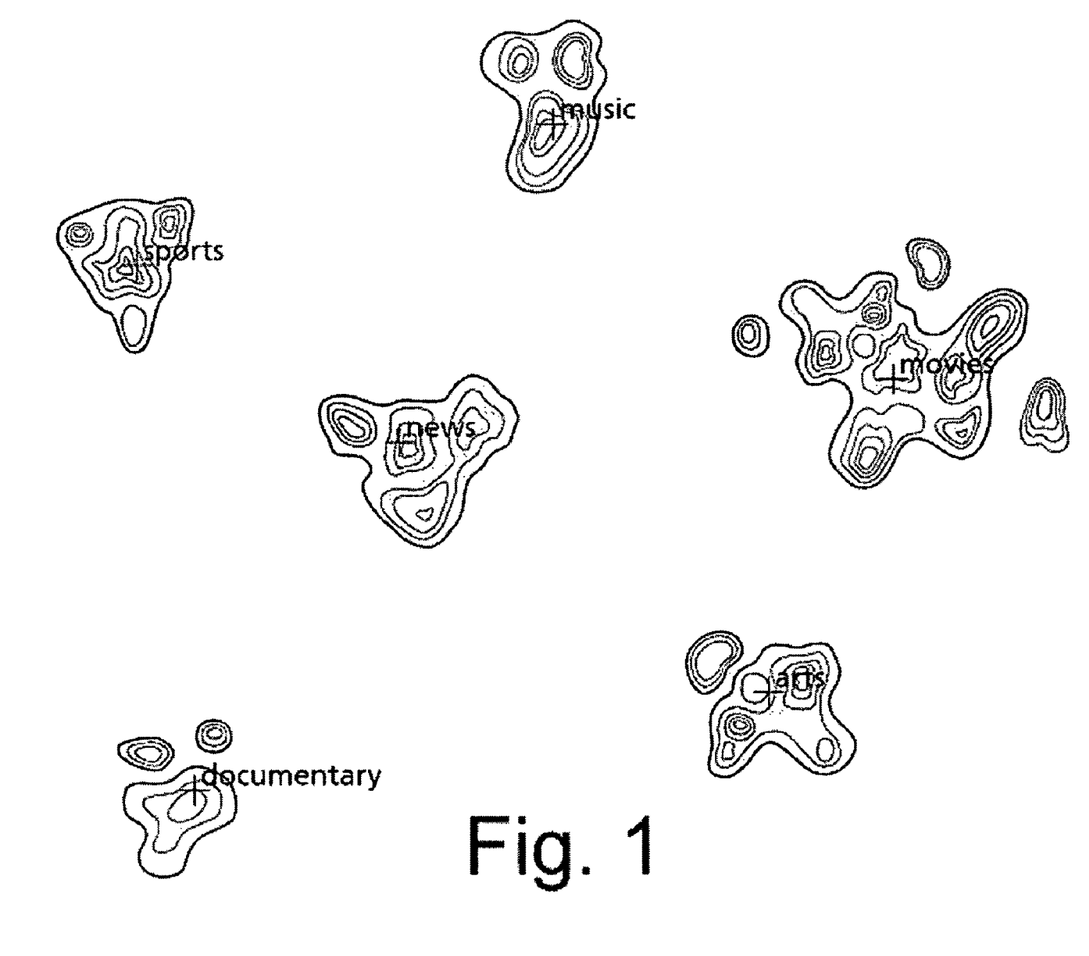
FIG. 1 shows a general map of information of potential interest to a user mapped as clusters of information based on similarities according to predefined (or self-organizing) similarities.

In FIG. 1 is shown how all areas of interest to a user may be structured according to similarities, thereby creating clusters that may be mapped in a three-dimensional space, although the similarities relate to features that are multidimensional. Areas of interest may be music
movies
sports
arts
news
documentary.

The mapping is shown as contours with "isodensity" curves, referring to a density of information, corresponding to the level of similarity, thereby essentially representing density as "height".

Figure 2:
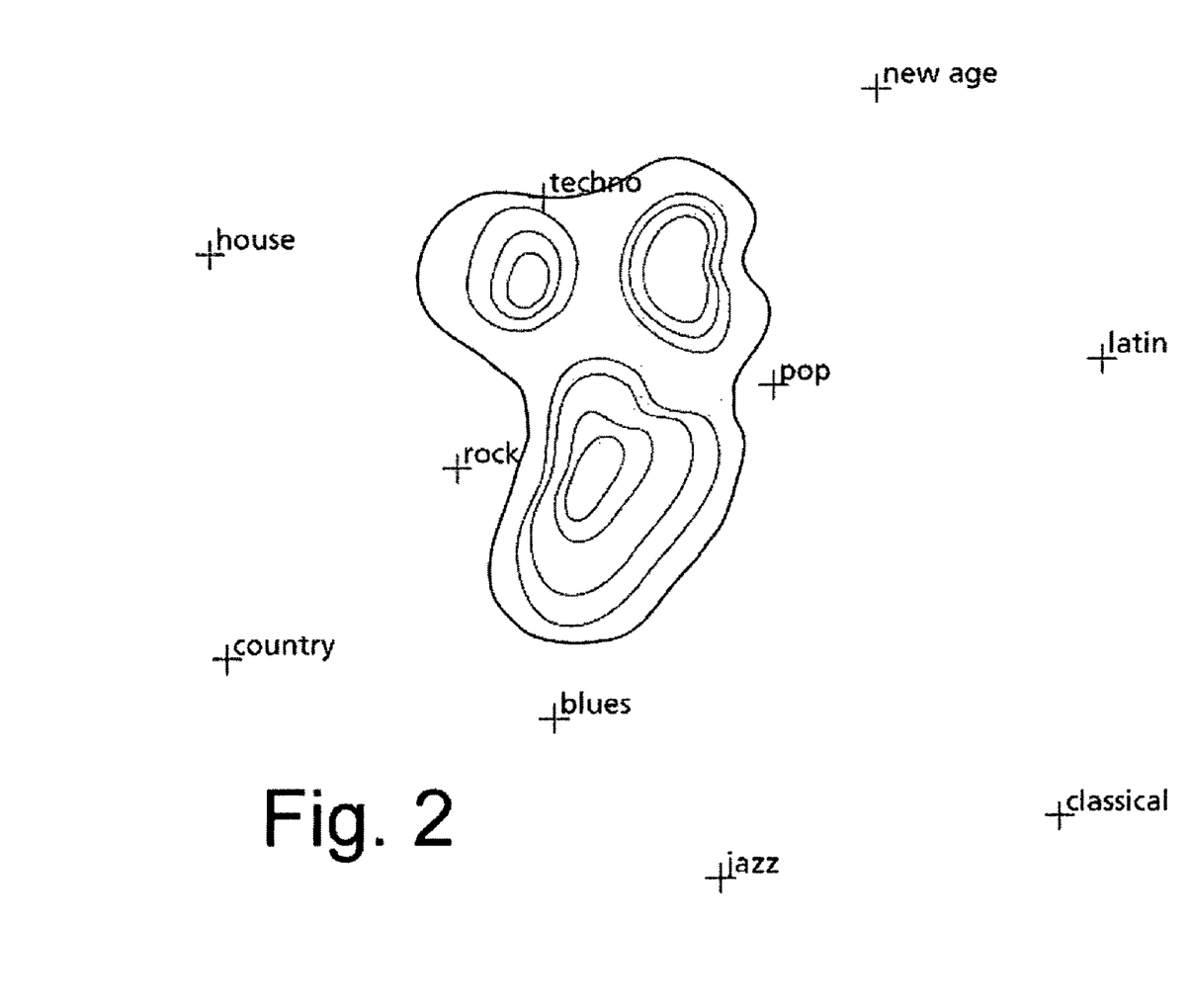
FIG. 2 shows an enlargement of one of the clusters of FIG. 1, the cluster relating to music.

FIG. 2 shows an enlargement of FIG. 1, in that the focus is put on music. The following distinguishing elements or genres may be considered:

pop
rock
blues
techno
new age
latin
jazz
classical, etcetera, although it is apparent that the music collection that has been classified finds the greatest similarities in techno, pop, rock, and blues, but very little contribution from the other elements. It is not possible to identify any particular recording from this clustering, but if a particular set of coordinates is called up, corresponding to a specific combination of elements, then the music closest to this coordinate will be retrieved and played or added to a playlist. Calling up a set of coordinates may be done by means of a touch screen or a mouse and cursor.

Figure 3:
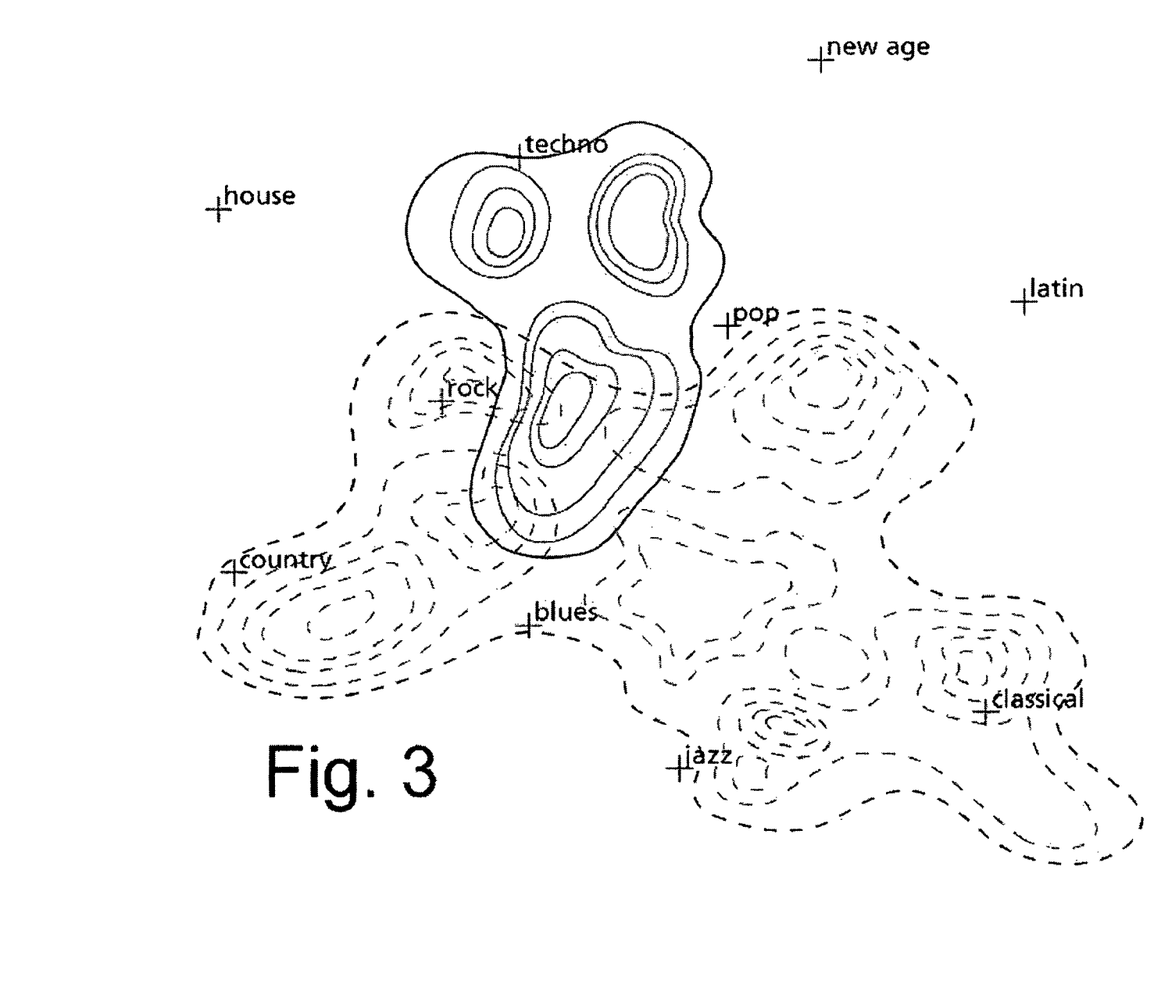
FIG. 3 shows an intersection between the music cluster of FIG. 2 with a cluster representing the known output of a particular composer or songwriter based on a corresponding set of similarities.

In FIG. 3 is shown how the existing music collection may interact with the output of a particular composer who is not fully represented in the collection. The composer's output has been mapped by corresponding criteria in order that the intesection is meaningful. Sections of the composer output may be integrated, or the whole of the output. However, for a particular user, who has a concentration of interest in a few of the many elements available or in a combination thereof, it is most likely that the composer output will be truncated before integration.

Figure 4:
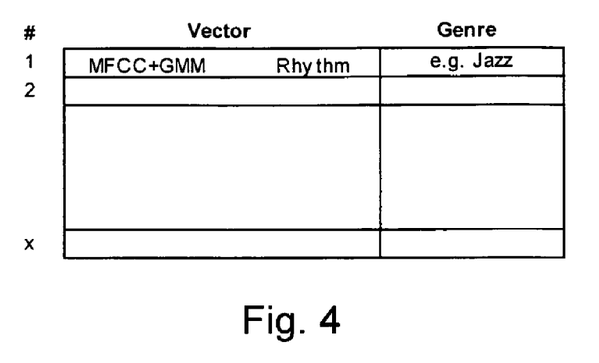
FIG. 4 shows the data definitions of a Super Seed, which is a factory-defined mapping of characteristic vectors versus related genre of music.

In FIG. 4 is shown the structure of the data set that represents genres as a factory-defined mapping of characteristic vectors versus a genre label. The data set is based on analyses of thousands of known music selections by the means described in greater detail in connection with FIG. 7.

Figure 5:
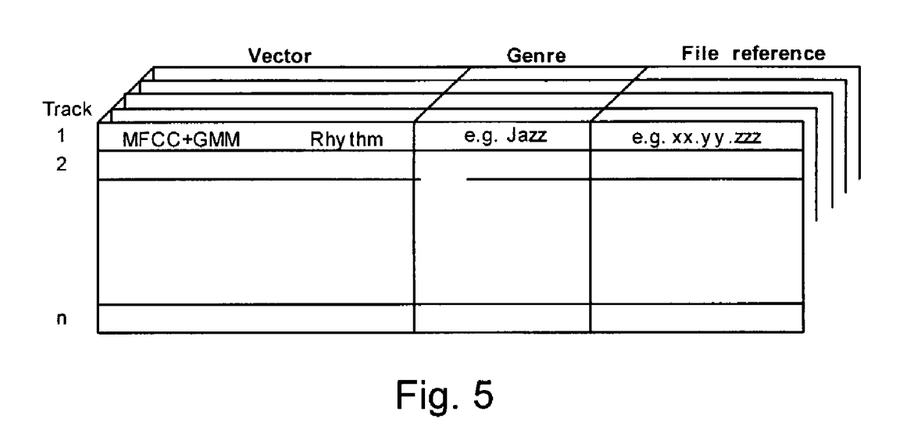
FIG. 5 shows the structuring of a user collection of data, such as a music collection.

In FIG. 5 is shown the structure of the user collection of data representing the particular user's music collection. This structure acts as the database storing the recorded information (the music) as data files (although the sources may be the types mentioned above). The music data are associated with metadata that relates to the genres, in that it contains e.g. one vector per track of music stored, the genre type and the locator for the storage, which may be a hard disc drive.

Figure 6:
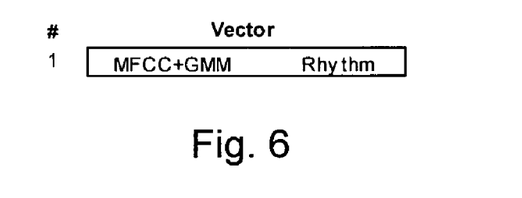
FIG. 6 shows the characteristics of an individual track that is in playing mode.

A table of the characteristics of a track that is actually in the replay mode is structured as shown in FIG. 6.

An entirely new and separate domain may be generated, either by user- or factory-defined genres, or by the fact that the new music track (recording) added displays characteristics that fall outside the established domains. The user does not need to know this, however, as the generation of a playlist for activating the automated reproduction of a series of sound recordings may happen completely without interference, just based on a broad and vague input.

However, there is one type of use of the system that is of particular interest: that of retaining or re-creating a particular mood. For this, the user only has to identify one particular recording (the seed recording) and request playback of similar recordings. The particular recording, which may be input manually from e.g. a web-search, will be analysed according to the method described above, and similar recordings, similarity being considered as a minimization of the multi-dimensional vector distance between the characteristics of the seed recording and the recordings already available. The seed recording may equally be input by reference to a previous replay, by date, or time of importing it. In the case of a less-defined mood a combination of seeds may be used.

A search for a particular recording that is only vaguely present in the mind of the user may be performed by inputting whatever textual and genre-based information is available and combining that with a seed recording that is in some way considered similar to the recording desired. The system will perform internal classification as described above and combine that with the partial title or genre information in order to extract with a high probability the very recording that was desired.

Figure 7:
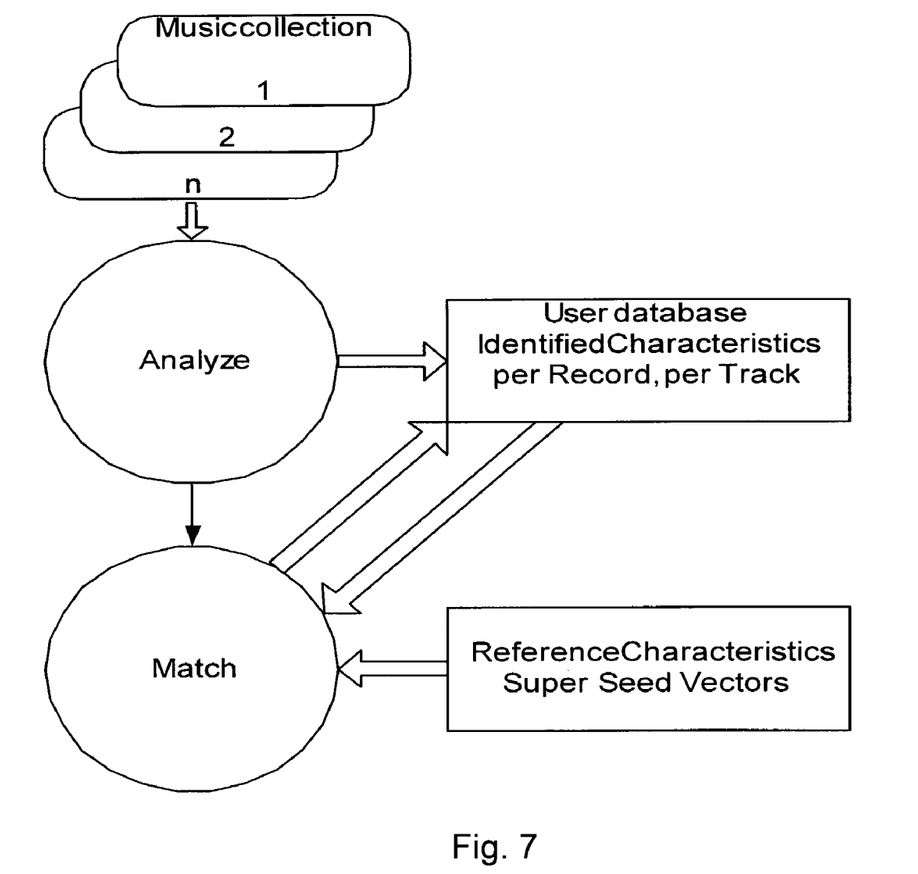
FIG. 7 shows the data and instruction flow for the mode of generating the user database.

In FIG. 7 is shown how the mapping and first generation of the user database is performed according to one embodiment of the invention. There are two types of input and one main type of output. The first input is a collection of music recordings as a time function that are analyzed for specific features, mainly based on the harmonic content as a function of time and the rhythmic content as a function of time. Such analysis methods are well known per se, see for instance Dixon, S.: "Automatic Extraction of Tempo and Beat from Expressive Performances", Journal of New Music Research Vol. 30, No. 1, pp. 39-58 (March 2001). The second input is the set of reference characteristics.

Figure 10:
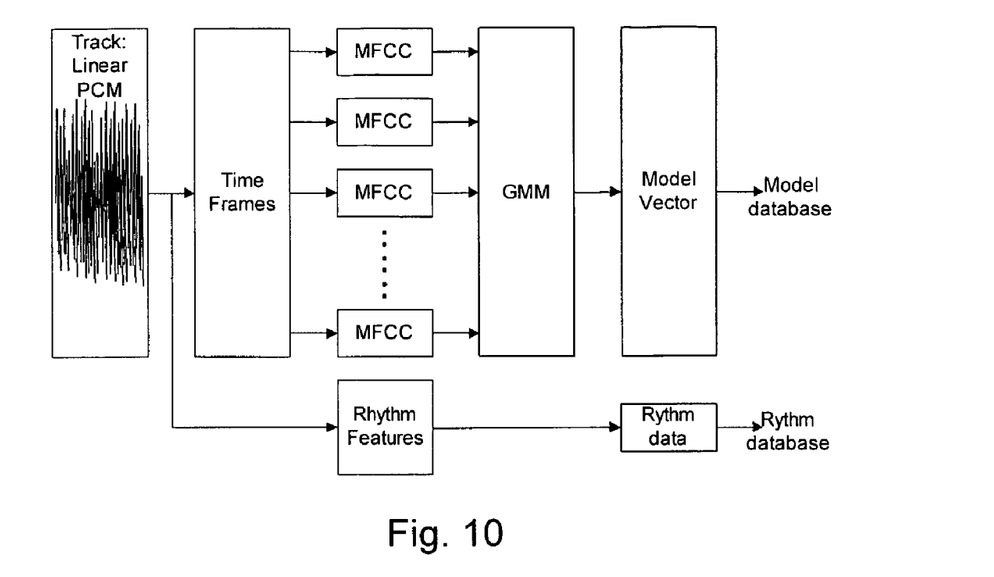
FIG. 10 shows the data flow for the music signal analysis.

When starting the procedure the music collection is not structured in any way and is only represented by its linear file (time function) as found on an internal hard disc drive, CDs, DVD's, a Local Area Network, or web-related resources. The file may be the extracted soundtrack from a music video. The file may be a complete audio data file or a data-reduced file (such as e.g. MP3), however in the latter case there may be some analyses that cannot be performed in an ideal manner. Reference is made to FIG. 10 and the text relative to this figure.

The flow of operation for generating the user database is the various sources are made accessible as a "music collection"

each track of each recording (a file) is analyzed by means of the "analyze" function described in further detail with reference to FIG. 10 each track of each recording (a file) is validated via the "match" function against the reference data set "super seed" to identify the factory-defined genre of the track the identified genre is updated into the field of the related track in the user database.

In parallel, but not forming part of the invention, discographical information relating to the track (artist, composer, title, duration) is also entered into a database.

Figure 8:
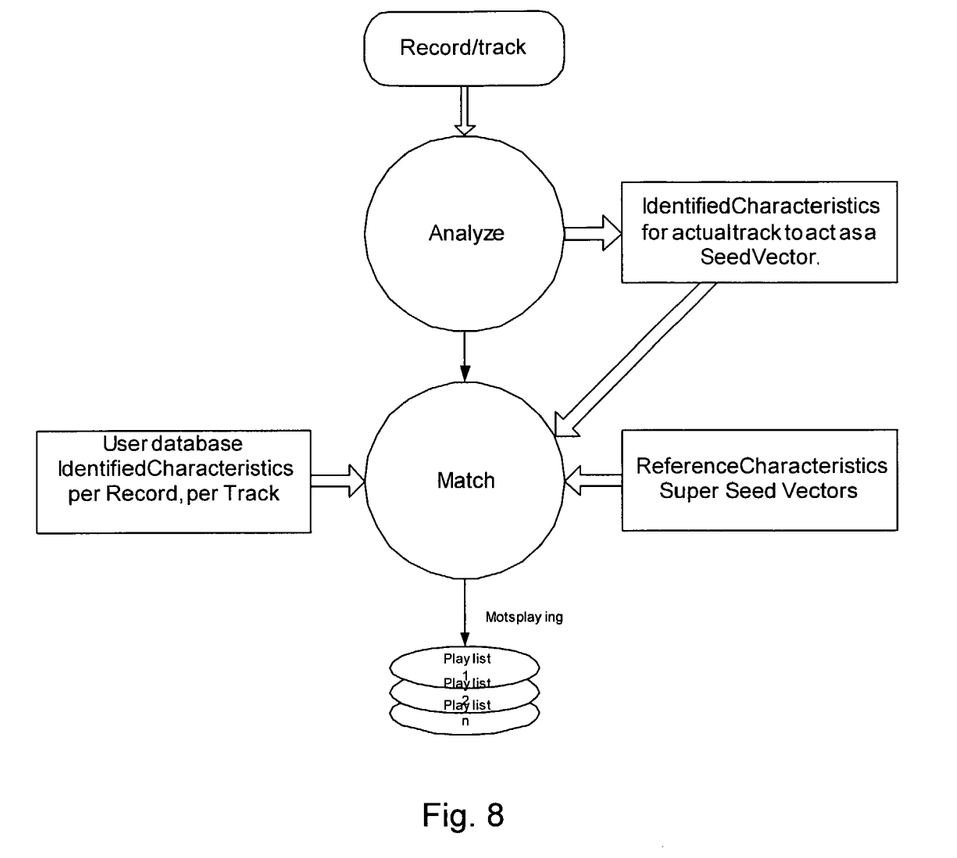
FIG. 8 shows the data and instruction flow for the mode of building a playlist according to one aspect of the invention.

In FIG. 8 is shown how a playlist is generated from the actual play of a particular track acting as the input query to the system. This particular track will typically be unknown by the system and so must be analyzed and have the genre or meta-genre attributes assigned, in order that the system may search for recordings already available in the same genre or meta-genre. This may be termed "More of the Same" replay, and it is an order that requires no other input from the user than precisely this statement. It is a playback order that is extremely useful in a media player.

Figure 9:
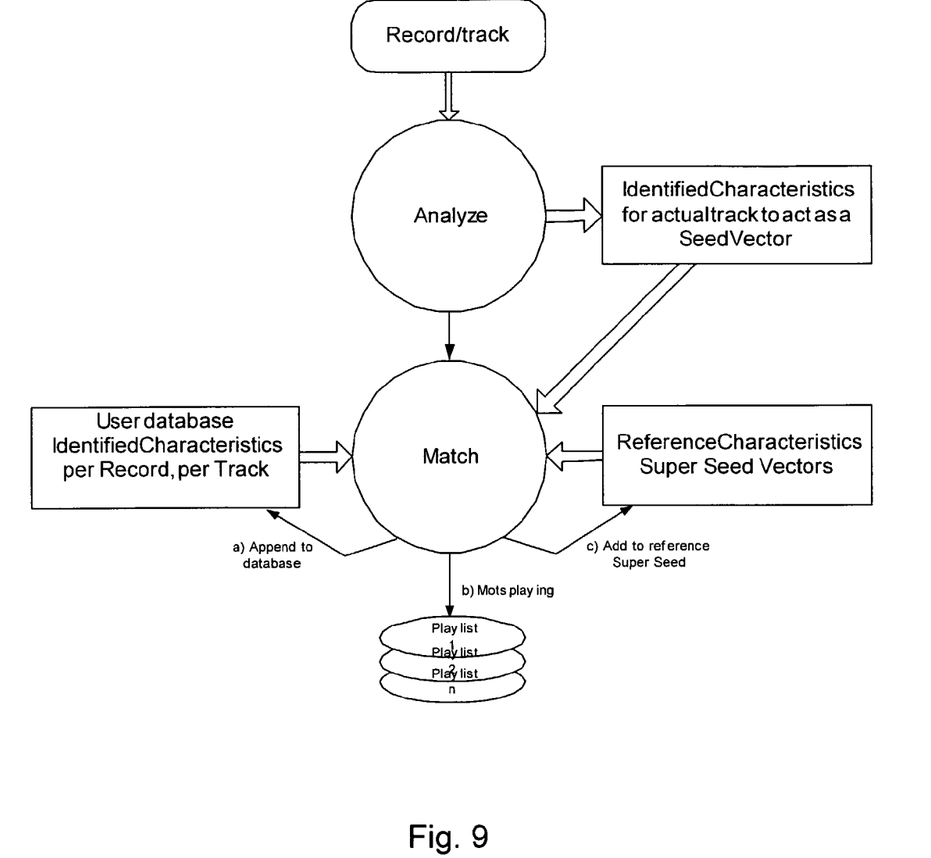
FIG. 9 shows the data and instruction flow for the mode of adding a new meta-genre to the database.

In FIG. 9 is shown the operation flow for adding a new or hitherto unused genre to the definitions of genres. During playback of a particular track this may be applied as a reference seed, giving the user the following options:

append the track characteristics to the existing user database (update with the new vector and file reference) and allocate a genre definition dynamically update the current playlist with "More-of-the-Same" (a genre identical to the one presently being played)

add the new seed vector to the reference "super seed" and allocate a genre definition.

In FIG. 10 is shown the dataflow relating to the analyze function. The input data is a linear PCM representation of the music signal in mono. In the present embodiment, the individual tracks are analyzed for characteristics, i.e. a number of coefficients per time frame of each piece of music, by extracting Mel Frequency Cepstrum Coefficients (MFCC) from each individual recording. Then a Gaussian Mixture Model (a clustering technique) is applied to the MFCC, resulting in a number (M) of coefficients for each recording. For a collection of N items this gives a matrix N×M, which is a vector representation. The clustering establishes a model over all frames. Furthermore, rhythm features are extracted and entered into a rhythm database.

Figure 11:
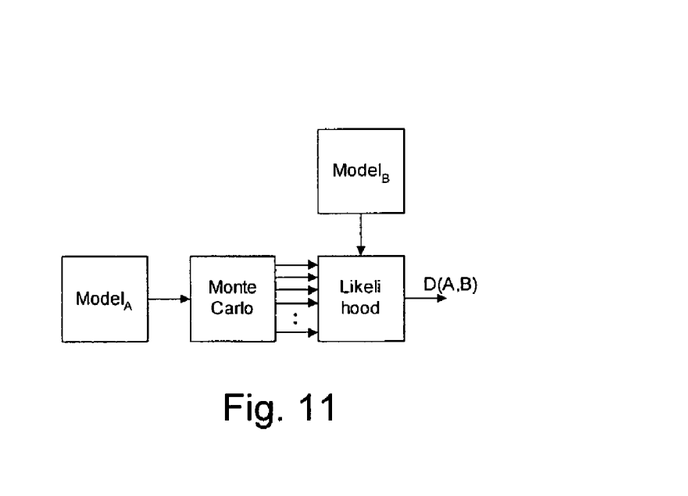
FIG. 11 shows the data flow for the distance function involved in the vectorial representation.

In FIG. 11 is shown how a measure of similarity is used. The probability that the sample of one Mixture Model (A) was generated by the other Mixture Model (B) is calculated. The Monte Carlo analysis gives a large number of samples (typically 3000) of Model A to approximate the likelihood of the MFCCs of one track "A" given the Model B of another track "B"; the probability relates to the vectorial distance D between the two tracks.

Figure 12:
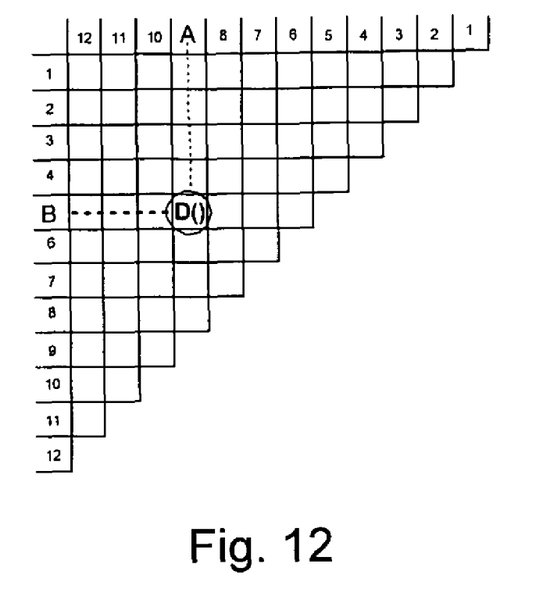
FIG. 12 shows a representation of a distance matrix.

The function Min(D(seed, K)) returns K indexes of tracks with the closest vectorial distance to the seed as shown in FIG. 12.

Figure 13:
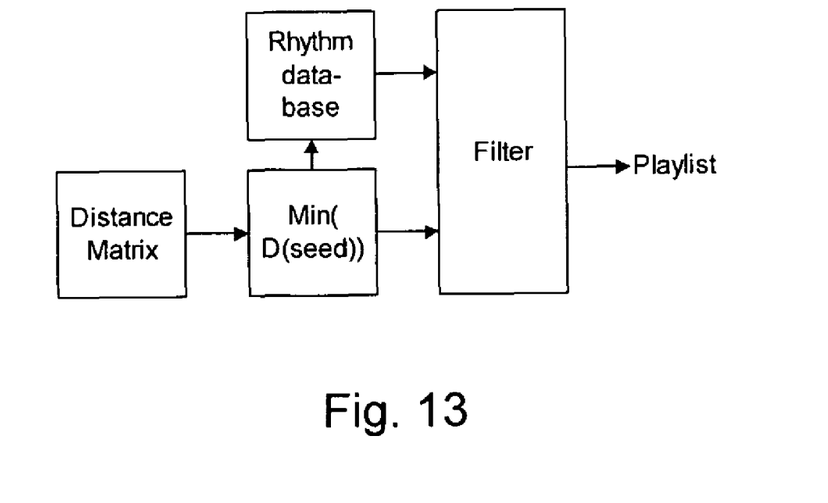
FIG. 13 shows the data flow involved in a match function.

Simultaneously, the rhythm data of these tracks are collected in the rhythm database, and the data filter in FIG. 13 weights the similarity by means of the distance measurement and the rhythm data to provide the final playlist as a result.

PLAY LIST APPLICATION EXAMPLES (with reference to FIGS. 14-19 as indicated)

After generating one or more play lists different modes of operation may be executed. A plurality (1→n) of play lists are generated based on individual seeds per list, (e.g. 9 lists).

1) Multiple and parallel play lists (FIG. 14)
   a. All play lists execute in parallel in the background (140).
      Optionally data of information might be displayed, at the same time, for all lists with highlight of cover/artist/track information for the comfort of the user (141→149).
   b. One play list is enabled to be active for the user (145), i.e. active in the amplifier and speaker/head set controlled by the user.
   c. Automatically a new play list is activated to be 'the current active' upon completion of an actual list. The active a status is indicated by a kind highlight (145.1).
   d. The user might force selection of another list to be 'the current active' list.

Figure 14:
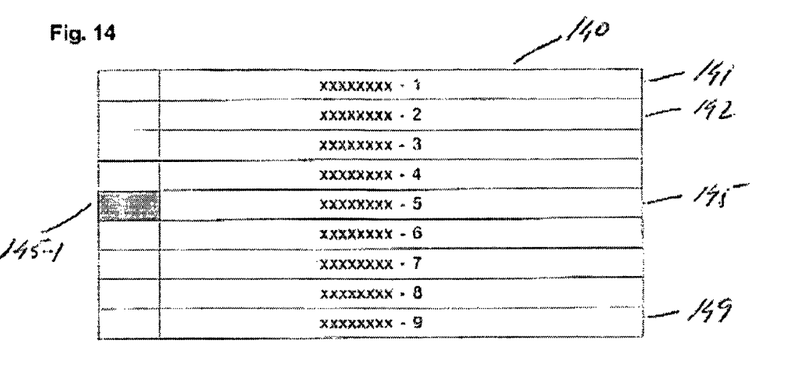
FIG. 14 shows the structure of a data set and a display on a media player.
Figure 15:
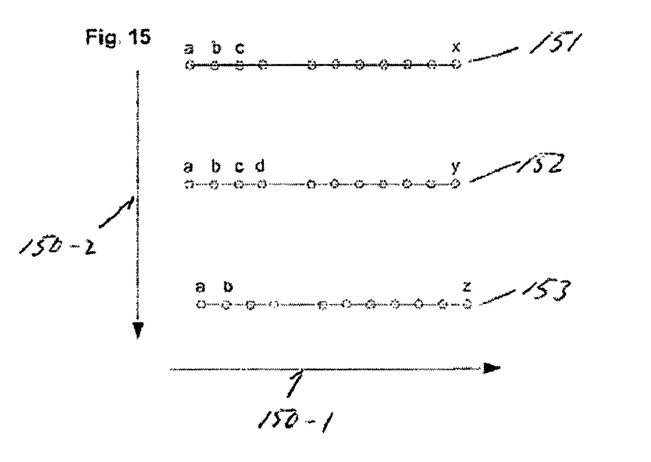
FIG. 15 shows the data set when accessed in randomized play modes.
Figure 16:
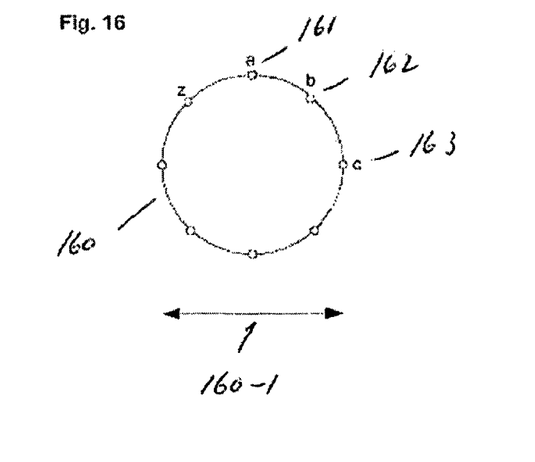
FIG. 16 shows the data set when arranged for circular replay.
Figure 17:
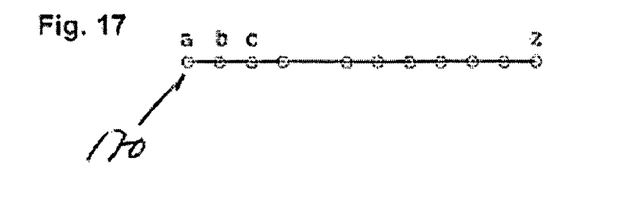
FIG. 17 shows modification of a playlist by introducing a new seed recording.
Figure 18:
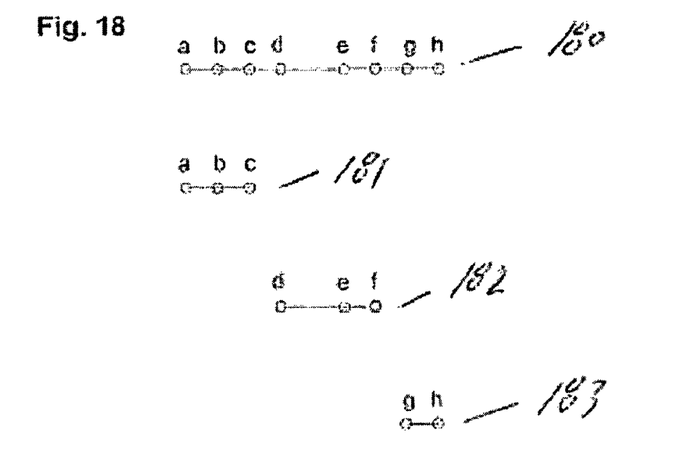
FIG. 18 shows the principle of splitting a playlist.

It should be noted that two modes of operation of the playlists executing in parallel in the background: for a shared music store (multiple users) there may be 9 parallel channels (continuing without limitation the present example) executing in parallel. For an individual user of a media player, it may be more appropriate to execute only one playlist at any one time, but to have time counters with addresses to individual items of the other (8, in the present example) playlists, with a capability to instantly switch to another playlist, and to the appropriate selection and "time consumed" on that particular list. In this way the parallel execution is simulated based on the database content.

2) Randomized play (FIG. 15)
   a. Horizontal mode (150.1): the playlists are executed automatically from start to end, i.e. the playback is sequential and horizontal within the same play list (151, 152,153).
   b. Vertical mode (150.2): the playlists are executed automatically in parallel one at a time, executing one track per list, i.e. the playback is vertical across several play lists (151→159).
   c. The user has the option to choose between the mode horizontal (150.1) or vertical (150.2) and might force selection of another list to be 'the current active' list.

3) Circular play list (FIG. 16)
   a. A play list is generated with a specific option to align tracks as a circular list (160).
   b. The tracks are ordered in the sequence beginning from the seed track (161) and forcing the 'next track' (162, 163) to be the one in line with the next shortest distance to the seed (161).
   c. The tracks are played back automatically one at a time in sequence.
   d. The user has access to all individual tracks via a wheel-like selection device, which can rotate/select in both directions i.e. clockwise and anti-clockwise (160-1).

Various features might be applied in modifying one/more play lists:

4) Introduce a new seed (FIG. 17)
   The contents of a playlist might be modified simply by replacing the seed track (170) and recalculate/reactivate the 'more of the same' function (MOTS).

5) Explode a play list (FIG. 18)
   The contents of a play list (180) might be exploded into a number (e.g. 9) of new individual play lists (181, 182,183).
   The criteria for splitting into the subset of play lists is a user defined 'mood' given as a distance parameter value.
   Alternatively the content of the play list is split into a number (n) of sub-lists each based on a number (n) of seed tracks selected from the initial list.

Figure 19:
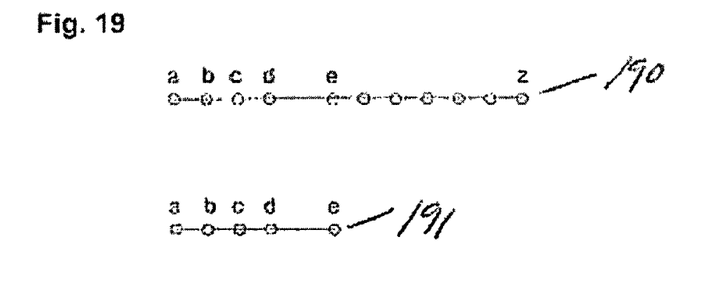
FIG. 19 shows the principle of a fixed-length playlist derived from a list of all candidates.

Fixed Length Play List (FIG. 19)

In principle a play list may have a variable length depending on the number of tracks that fulfill the 'more of the same' criteria (190). The user might define a fixed length of the list (191). This will increase the quality of the more-of-the-same identity on the contents in the list.

In FIGS. 7, 8, and 9 the information shown in rectangular boxes is of no concern to the user, as it is an internal representation of the results of the analyses described above. The user may interface to the system by applying his own genre-derived classification to domains, in order to exert individual influence on the playlist. As a default, the genres are defined by the mapping of characteristic vectors in the factory before delivery. However they may be musicologically established characterizations, they may be copied from a cover of a recording, or they may simply be the internal classification or meta-genre used by the system. Similarly, the entire output of a performer, a group of performers, or a composer may be analysed by means as described above and create domains according to Artists, and the two types may be made to intersect.

The existing domain structure may be used as the basis for adding new members to a domain by using the above procedures as shown in FIG. 7. Effectively, this means that the shape and level contours on FIG. 2 are changed, and in case the characteristics of the music added to the collection are different from those already represented, the area of the cluster will increase. It is also likely that the area of overlap in the intersection shown in FIG. 3 will be larger, unless the user is moving away from this particular composer's styles.

In the present system, machine assisted playback has been obtained that not only accepts input from users according to user-defined criteria, but also criteria that are inherent in the music itself. The latter are criteria that the user does not have to be conscious of, and the use of the system is able to save the user's time, both as to abolishing the need to index a music collection, but equally in retrieving one or more recordings for playback. Various supplementary features may be present to enhance the performance of the automatic playlist generation, such as the possibility of inputting desires for the sequence in which the playlist is to be executed.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

The invention claimed is:

1. A procedure for controlling the playback of recordings from a collection of recordings, said collection of recordings being stored in digital form in at least one location or in a distributed storage system, each recording being classified in a multidimensional parameter space common to all recordings stored, according to pre-defined or self-organizing parameters, the procedure comprising inputting a playback order structured as a generally fuzzy expression of general characteristics by:
  inputting the fuzzy expression in the form of one or several seed recordings, said seed recordings being classified in the same multidimensional parameter space used for the collection,
  comparing the multidimensional classification to combinations of classifications identifying each recording in said collection,
  outputting, for playback, a list of access codes for those recordings having parameters fulfilling a multidimensional distance criterion with respect to the seed recording(s), the list being a circular list ordered according to the distance to the seed recording(s),
  using the list to access sequentially the recordings concerned from the storage system,
wherein the user has access to all individual tracks via a wheel-like selection device which rotates/selects in both directions; and
wherein a plurality of playlists is generated, and further comprising:
  executing all plavlists in parallel,
  the user enabling a playlist to be active for the user,
  automatically activating a new playlist upon completion of an actual playlist, and
  the user forcing selection of another playlist to be active.

2. A procedure according to claim 1, wherein the pre-defined parameters are based on running spectral analyses for each recording combined with rhythm analyses.

3. A procedure according to claim 1, wherein the classification of each recording includes defining the multidimensional vectorial distances between self-organizing clusters obtained by applying running spectral analyses and rhythm analyses for the collection of recordings.

4. A procedure according to claim for adding a recording to the collection, wherein the recording is subjected to running spectral analyses for each recording combined with rhythm analyses of the types that were applied to the prior members of the collection, and associating the classification with the access code for the added recording.

* * * * *